No. 890,697. PATENTED JUNE 16, 1908.
J. E. NOEGGERATH.
PROTECTIVE DEVICE FOR UNIPOLAR MACHINES.
APPLICATION FILED OCT. 4, 1905.
2 SHEETS—SHEET 2.
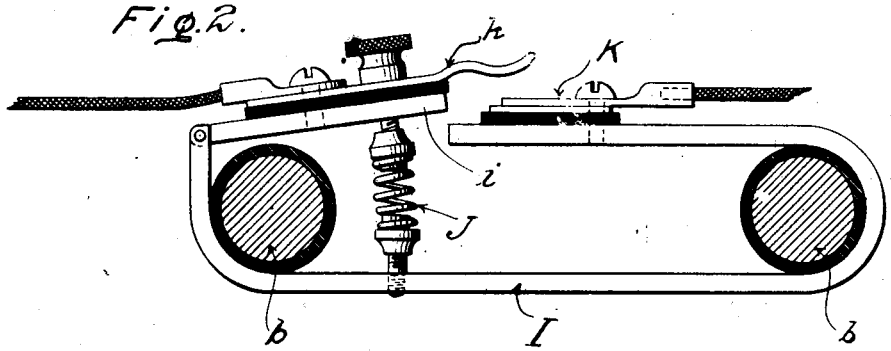
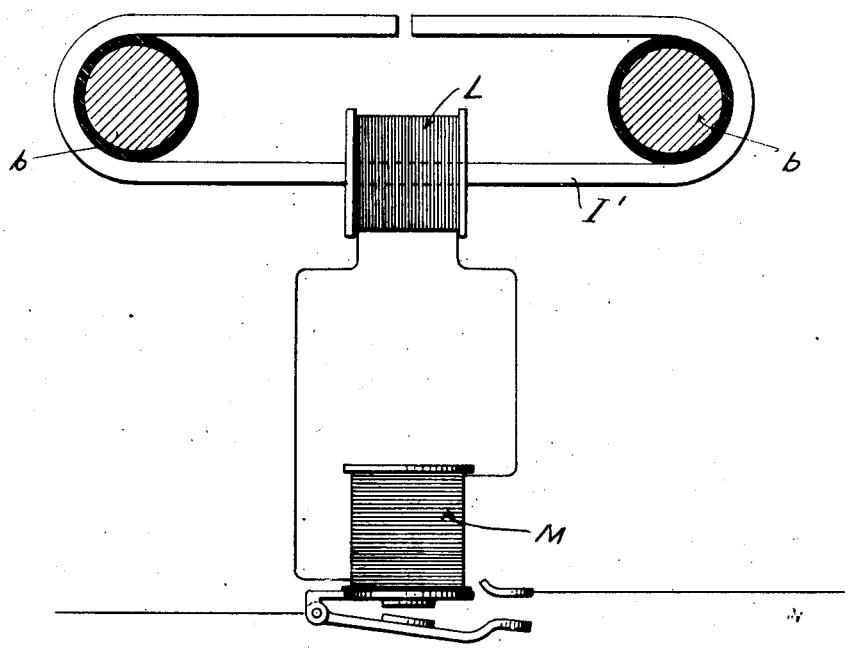
Witnesses:
Inventor
Jakob E. Noeggerath.

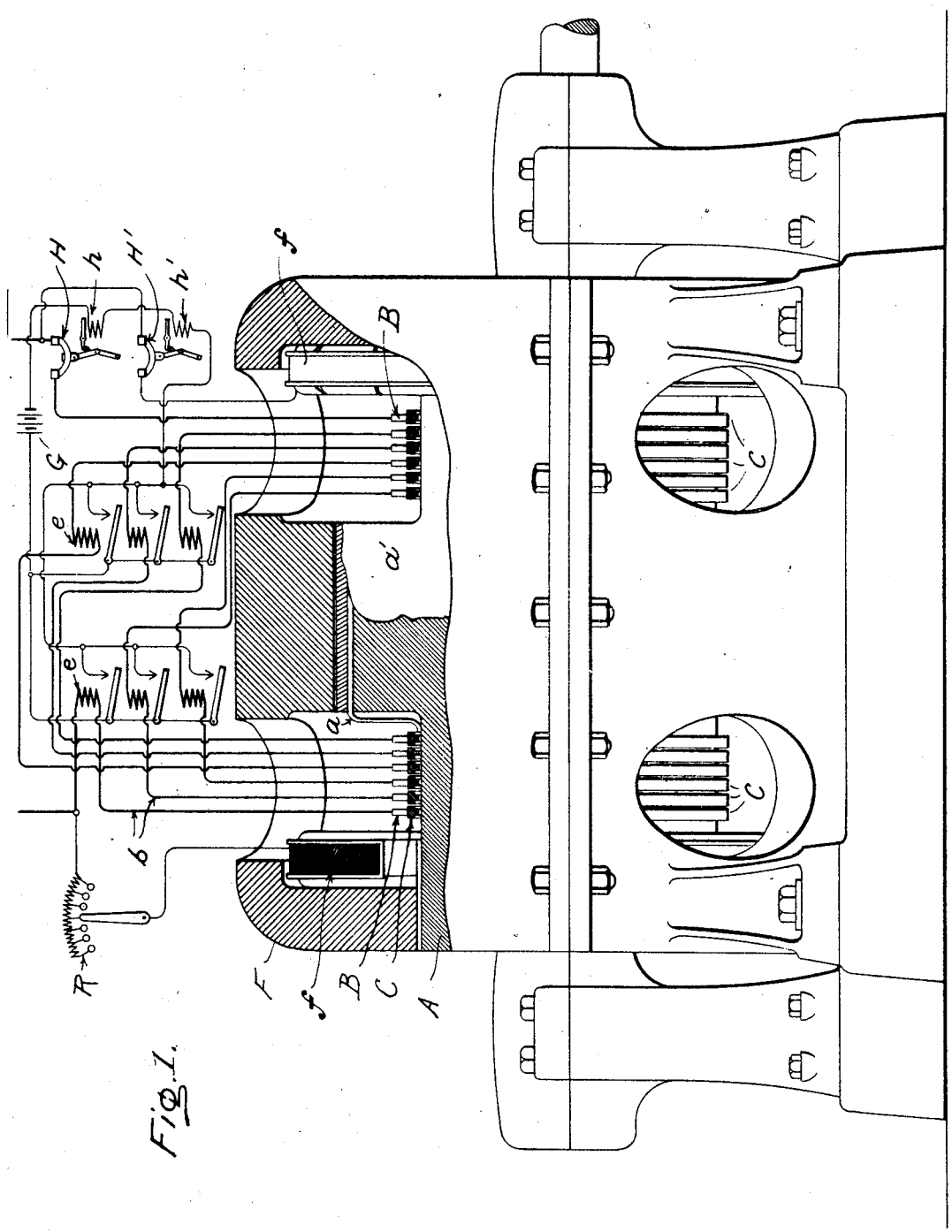

UNITED STATES PATENT OFFICE.

JAKOB E. NOEGGERATH, OF SCHENECTADY, NEW YORK, ASSIGNOR TO GENERAL ELECTRIC COMPANY, A CORPORATION OF NEW YORK.

PROTECTIVE DEVICE FOR UNIPOLAR MACHINES.

No. 890,697.    Specification of Letters Patent.    Patented June 16, 1908.

Application filed October 4, 1905. Serial No. 281,233.

*To all whom it may concern:*

Be it known that I, JAKOB E. NOEGGERATH, a citizen of the United States, residing at Schenectady, county of Schenectady, State of New York, have invented certain new and useful Improvements in Protective Devices for Unipolar Machines, of which the following is a specification.

My invention relates to dynamo-electric machines of the unipolar type, and its object is to provide means for protecting such machines against accidental internal short-circuits,—that is, against short-circuits of individual armature conductors. In coil-wound dynamo-electric machines it is not practicable to guard against internal short-circuits, since such protection would necessitate the insertion of protective devices between the several turns of the coils of the machine. In unipolar machines, however, the several rotating armature conductors are not connected directly to each other, but the connection between them is formed by external stationary conductors extending from the brush or other collecting device at one end of one armature conductor to a similar brush at the opposite end of a second conductor. Consequently, in such a machine it is possible to insert protective devices in these cross-connections, and such devices, if responsive to an abnormal flow of current, may be utilized to protect the machine against short-circuits of individual conductors.

My invention consists in a novel form of protective device actuated by the flux surrounding the cross-connecting conductors. By using this form of device I render it unnecessary to insert a coil in the cross-connections which are ordinarily so large that bending them or inserting a coil in them would be inconvenient.

In the accompanying drawings Figure 1 is a diagram of the connections of the protective devices for a unipolar dynamo-electric machine; Fig. 2 shows the mechanical construction of the protective devices; and Fig. 3 shows a modification thereof.

In Fig. 1, F represents the unipolar field structure which is provided with magnetizing field coils $f$. A represents the rotatable armature carrying a plurality of armature conductors $a$, which are shown held in place at the periphery of the armature by a steel ring or band $a'$. Each armature conductor is connected at its opposite end to collector rings C. Stationary brushes B bearing on the collector rings serve to lead off the current generated in the several armature conductors. The brushes at opposite ends of the machine are cross-connected by stationary conductors $b$, which are arranged to place the several armature conductors in series. R represents a rheostat or variable resistance in the field circuit. $e$ $e$ represent relays or protective devices in the cross-connections, which, when abnormal current flows in any one of the cross-connections, due to the short-circuiting of an armature conductor, will close a circuit through a suitable source of current G and through the tripping coils $h$ and $h'$ of the circuit-breakers H and H', which are placed in the main armature circuit and in the field circuit respectively. By the opening of the field circuit the machine is demagnetized, and in this manner protected against overheating due to the short-circuited armature conductor. The cross-connections $b$ are usually of large size so that the insertion of coils directly in them, as shown diagrammatically in Fig. 1, is inconvenient in practice. Consequently, I prefer to use a device of the type shown in Fig. 2, which may be placed around a straight conductor and which is actuated by the flux surrounding the conductor.

In Fig. 2, I represents a magnetic circuit in the form of a loop surrounding one or more conductors $b$ and comprising a movable portion $i$ which is normally held by a compression spring J in such a position as to form an air-gap in the magnetic circuit. The spring J is proportioned to resist the pull on the member $i$ exerted by the normal flux surrounding the conductor $b$, but if the conductor $b$ should be short-circuited, the increase of flux due to the short-circuit current would pull down the member $i$, compressing spring J, and bringing the relay contact $k$ carried by member $i$ into engagement with stationary contact K. A circuit is thus closed which may be used to open the field or armature circuit or both in the manner shown in Fig. 1.

In Fig. 3 I have shown a type of protective device, which, like that of Fig. 2, utilizes the flux surrounding a straight conductor, but which responds to a change in flux of a predetermined amount instead of to a constant flux of a predetermined strength. It comprises a magnetic loop I' surrounding one or more conductors $b$ and carrying a coil L. The loop I' and coil L form the magnetic core and the secondary respectively of a transformer of which the conductor $b$ forms the primary. Ordinary fluctuations in current in conductor $b$ induce voltages in coil L insufficient to actuate the device, such as the relay or trip magnet M, supplied from the coil, but if a short-circuit should occur, the rush of current would produce a great and rapid increase in the flux around conductor $b$ and this would induce a voltage in coil L of sufficient magnitude to actuate the tripping device.

Other arrangements of the protective devices may be employed as desired, and consequently I do not wish to limit myself to the particular construction and arrangement of parts here shown, but aim in the appended claims to cover all modifications which are within the scope of my invention.

What I claim as new and desire to secure by Letters Patent of the United States, is,—

1. In a unipolar dynamo-electric machine, a revolving armature carrying a plurality of conductors, collector rings connected to opposite ends of said conductors, brushes bearing on said collector rings, conductors cross-connecting the brushes at opposite ends of the armature conductors, protective devices controlled by the flux surrounding said cross-connecting conductors, and means controlled by said devices for opening a circuit of the machine.

2. In a unipolar dynamo-electric machine, a revolving armature carrying a plurality of conductors, collector rings connected to opposite ends of said conductors, brushes bearing on said collector rings, conductors cross-connecting the brushes at opposite ends of the armature conductors, protective devices comprising portions surrounding said cross-connecting conductors and responsive to the flux surrounding said conductors, and means controlled by said devices for opening a circuit of the machine.

In witness whereof, I have hereunto set my hand this second day of October, 1905.

JAKOB E. NOEGGERATH

Witnesses:
 BENJAMIN B. HULL,
 MARGARET E. WOOLLEY.